Feb. 3, 1959     A. B. SKROMME     2,871,780
BALER FEEDING MEANS
Filed Sept. 2, 1955

INVENTOR.
A. B. SKROMME

United States Patent Office 2,871,780
Patented Feb. 3, 1959

2,871,780

BALER FEEDING MEANS

Arnold B. Skromme, Moline, Ill., assignor, by mesne assignments, to Deere & Company, a corporation of Delaware Application September 2, 1955, Serial No. 532,208

4 Claims. (Cl. 100—189)

This invention relates to a crop handling machine in the form of a baler having pickup means and more particularly to the means for feeding crops from the pickup means to the associated bale case.

A typical agricultural baler includes a mobile frame adapted to be drawn over a field of previously harvested and windrowed crops by a tractor. The frame carries pickup means which picks up windrowed crops and conveys them rearwardly to means operating to feed the crops into an associated bale case, the bale case having an upright wall in which is formed a feed opening for accepting the crops. It is conventional to utilize a cross auger for the purpose of feeding the crops into the bale case, a typical example which is shown in the U. S. patent to Crumb 2,450,082. It is also conventional in many balers to provide secondary packer means usually in the form of feeder fingers operative at the discharge end of the auger to move the crops through the feed opening and into the path of a reciprocating plunger which compresses the crop into bales. Normally the packer fingers are mounted on the baling case and are operated in timed relation with the plunger to move into and to drive the hay into the bale case when the plunger is in its retracted position. It is therefore necessary to provide safety means for positively driving the fingers out of the bale case which in addition to the operating means for moving the fingers makes the mechanism or system relatively complicated. Regardless of the various safety features installed to prevent such happening, there remains the possibility of a breakdown of the mechanism which will result in the packer fingers being caught within the bale case and within the path of the plunger with the ultimate result that the baler must be shut down to provide repair work of relatively major proportion.

It is desirable therefore to eliminate wherever possible any part of the baler which normally operates to pass within the path of the plunger and it is a main purpose of this invention to eliminate the feeding fingers or other type of feeder means and to substitute therefor a relatively simple and novel method of moving material into the bale case without causing part thereof to extend within the case. This will be done by providing a transverse auger which normally has its discharge end adjacent to the feed opening of the bale case and which is mounted on the baler by resilient means which will permit the auger to move laterally away from the feed opening upon the material being packed against the plunger head when it has closed the feed opening. Upon the plunger being retracted from the feed opening the auger will then force the hay laterally and into the bale case as it returns to its normal position. There will be provided stop means which will limit the lateral movement of the auger toward the bale case to prevent the auger at all times from entering the feed opening.

The foregoing and other important differences and advantages of the invention will become apparent to those skilled in the art as the nature of the invention is better understood in the following detailed description illustrated in the accompanying drawings.

Figure 1:
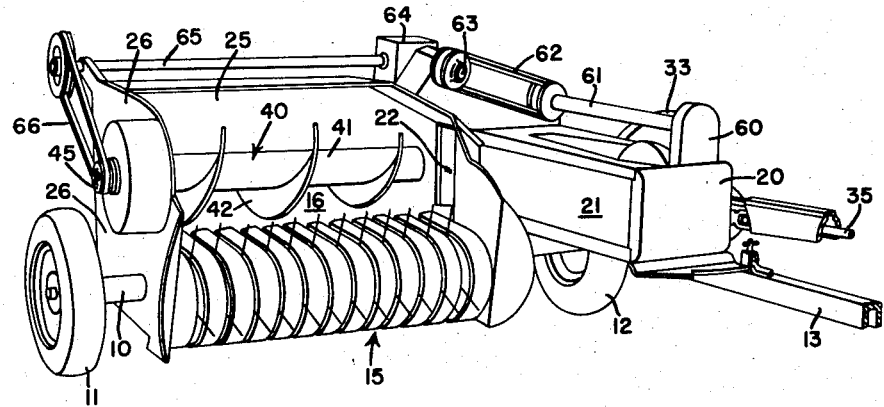
Fig. 1 is a front perspective view of a representative baler embodying the invention.

As is typical of the conventional baler, the baler chosen here for purposes of illustration comprises a mobile main frame 10 carried on right and left hand wheels 11 and 12 for advance over a field of previously harvested and windrowed crops, a forwardly extending draft tongue 13 serving as a medium by means of which the baler may be connected to a tractor. The main frame carries pickup means 15 for picking up the windrowed crops and delivering them rearwardly to a deck or floor means 16 that leads laterally inwardly to a fore-and-aft extending bale case 20, the bale case having an upright inner or right hand wall 21 in which is formed a feed opening 22 from which the floor means 16 extends laterally outwardly. The pickup means is delineated at its rear by a transverse rear wall 25 and is further delineated at its outer or right hand end by an outer wall 26 which serves as a support. A reciprocating baling plunger 30 is carried in the bale case 20 for operation on alternate compression and retracting strokes, the plunger being conventionally driven by a pitman 31 and crank shaft 32 on which is a flywheel 33. Power for driving the crank shaft 32 is derived in the first instance from the tractor, not shown, by a conventional power takeoff shaft which drives a propeller shaft 35 which delivers power to a gear transmission, also not shown.

The outer wall 26 of the pickup means 15 serves to support a transverse auger 40 above the floor means 16, the auger having its axis extending laterally from and normal to the plane of the upright wall section 21 of the bale case 20. The auger comprises a hollow core 41 on which is wound a helical flight 42, the purpose of which is to engage and move the crops laterally and inwardly over the floor 16 upon rotation of the auger.

The auger 40 is mounted by means of axially spaced apart ribs or supports 47 which are provided with square openings at their center for mounting on a transversely extending and square drive shaft 43. The shaft 43 is mounted in cantilever fashion from its right or outermost end which extends through a spring housing 44 and which has mounted thereon a belt pulley 45. Suitable bearings 46 are positioned adjacent the housing 44 to permit rotation of the shaft 43 and to prevent axial movement of the shaft 43. On the outer or right end of the core 41 are a pair of bearing plates 49 and 50 which are axially spaced apart to provide a slot in which a circular plate 51 may be mounted. The inner surface of the plate 51 abuts against an annular stop 52 which is fixed to the spring housing 44. Thus the auger 40 is mounted for axial movement but is limited in its innermost axial position to that determined when the plate 51 abuts the stop 52. Circumposing the outer end of the shaft 43 is biasing means in the form of a pre-compressed spring 55 which has one end abutting the end of the housing 44 and the other end abutting the plate 51. The spring 55 biases the auger 40 to the left or inwardly toward the feed opening 22.

Drive means for rotating the auger is carried from the input shaft 35 by suitable gearing, not shown, contained in safety shielding 60 (Fig. 1), from which a rearwardly extending shaft 61 projects to drive a belt and sheave means 62 connected with a transmission drive shaft 63. The shaft 63 extends rearwardly to a gear casing 64 and drives through a bevel gear arrangement, not shown, or other suitable gearing a transverse shaft 65 which extends across the rear of the baler. A belt and sheave arrangement 66 is provided on the right end of the shaft 65 and operates to drive the auger pulley 45.

Figure 2:
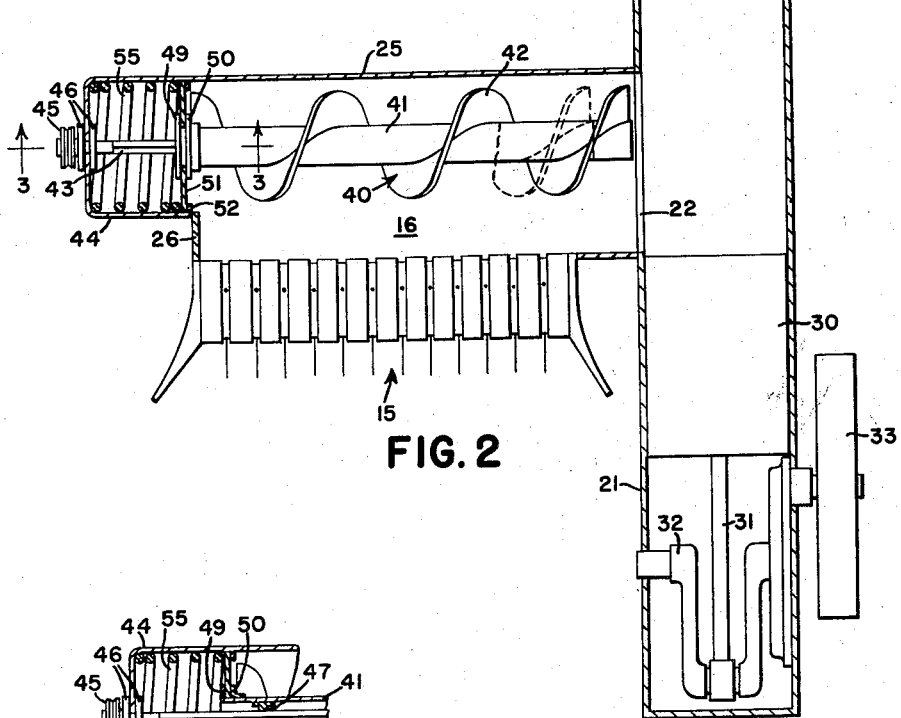
Fig. 2 is a transverse sectional view of the auger bale case and pickup and feeding mechanism.
Figure 3:
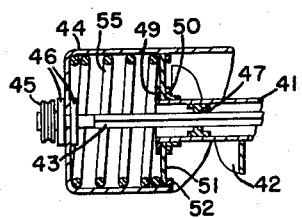
Fig. 3 is a sectional view taken along lines 3—3 of Fig. 2.

The baler operates in the following manner. The plunger 30 operates to reciprocate forwardly and rearwardly, opening and closing the feed opening 22. When the feed opening 22 is closed, the transverse auger 40 which has its left end normally adjacent to the feed opening will continue to pack hay or other such material against the side of the plunger 30. Upon a considerable quantity of material being packed against the side of the plunger 30 the auger will compress the spring 55, which is of relatively small strength, to drive the auger laterally away from the opening to a position as shown in dotted representation in Fig. 2. Then, when the plunger 30 uncovers the feed opening 22, the hay, because of its compaction by the auger and because of its own resilience, will surge into the feed opening. The momentum created by the spring will cause the hay to depart from the end of the auger and to be deposited in the bale case and in the path of the plunger. Upon the plunger again closing the opening 22 the cycle will be repeated. Thus, the auger will reciprocate laterally in timed relationship with the plunger opening and closing the feed opening but does not have direct drive means for causing it to reciprocate. Likewise, the reciprocating motion of the auger will cause the hay to be moved into the bale case without the auger itself entering therein.

While only one form of the invention has been shown it should be recognized that other forms and variations could exist without departing basically from the broad general principle herein disclosed. It should, therefore, be understood that the one form of the invention is described with the view of clearly and concisely illustrating the principles of the invention and that while this is the preferred embodiment it is desired not to limit or narrow the invention beyond that which is claimed.

What is claimed is:

1. A baler comprising: a mobile frame, an elongated bale case mounted on the frame at one side thereof and having an upright side wall formed with a feed opening and having a baling plunger mounted in the bale case for reciprocating lengthwise of the bale case to alternately cover and uncover the feed opening; material receiving floor means extending laterally outwardly from the upright side of the bale chamber at said feed opening; a rotatable auger operative to move material laterally inwardly over the floor means and having one end normally proximate to and laterally outwardly of the feed opening; means mounting the auger on the frame for axial shifting inwardly toward and outwardly from the feed opening; and resilient means biasing the auger inwardly and resisting movement thereof outwardly and away from the feed opening as the material is compressed against the plunger upon its covering the feed opening.

2. A baler comprising: a mobile frame, an elongated bale case mounted on the frame at one side thereof and having an upright side wall formed with a feed opening and having a baling plunger mounted in the bale case for reciprocating lengthwise of the bale case to alternately cover and uncover the feed opening; a drive mechanism for the plunger; material receiving floor means extending laterally outwardly from the upright side of the bale chamber at said feed opening; a rotatable auger operative to move material laterally inwardly over the floor means and having one end normally adjacent to and laterally outwardly of the feed opening; means mounting the auger on the frame for axial shifting inwardly toward and outwardly from the feed opening; and resilient means biasing the auger inwardly and resisting movement thereof outwardly and away from the feed opening as the material is compressed against the plunger upon its covering the feed opening; and auger drive means connected to the drive mechanism for operating the auger.

3. A baler comprising: a mobile frame, an elongated bale case mounted on the frame and having an upright side wall formed with a feed opening and having a baling plunger mounted in the bale case for reciprocating lengthwise of the bale case to alternately cover and uncover the feed opening; material receiving floor means extending from the upright side of the bale chamber at said feed opening; an auger operative to move material over the floor means toward the feed opening; an auger drive shaft mounted on the frame; a drive mechanism for rotating the drive shaft; means mounting the auger on the drive shaft for causing the auger to rotate in unison with the drive shaft and permitting concomitant axial movement of the auger; stop means between the auger and frame for limiting axial movement of the auger in one direction to a position in which its discharge end is adjacent to and laterally outwardly of the feed opening; and means between the frame and the auger for biasing the auger in the one direction and yieldingly resisting axial movement thereof in the opposite direction and away from the feed opening, the strength of the biasing means being such as to permit material being packed between the plunger when it covers the feed opening and the discharge end to drive the auger axially in said opposite direction and to cause the auger to drive the material into the bale case upon the plunger uncovering the feed opening.

4. A baler comprising: a mobile frame, an elongated bale case mounted on the frame and having an upright side wall formed with a feed opening and having a baling plunger mounted in the bale case for reciprocating lengthwise of the bale case to alternately cover and uncover the feed opening; material receiving floor means extending laterally outwardly from the upright side of the bale chamber at said feed opening; a rotatable auger operative to move material laterally inwardly over the floor means and mounted for axial movement on the frame; stop means between the auger and frame for limiting axial movement of the auger in one direction to a position in which its discharge end is adjacent to and laterally outwardly of the feed opening; and means between the frame and the auger for biasing the auger in the one direction and yieldingly resisting axial movement thereof in the opposite direction and away from the feed opening, the strength of the biasing means being such as to permit material being packed between the plunger when it covers the feed opening and the discharge end to drive the auger axially in said opposite direction and to cause the auger to drive the material into the bale case upon the plunger uncovering the feed opening.

References Cited in the file of this patent
UNITED STATES PATENTS

| | | |
|---|---|---|
| 1,914,486 | Burton | June 20, 1933 |
| 2,030,031 | Innes | Feb. 4, 1936 |
| 2,571,489 | Russell | Oct. 16, 1951 |
| 2,592,932 | McCellan et al. | Apr. 15, 1952 |
| 2,627,714 | Freeman et al. | Feb. 10, 1953 |
| 2,688,284 | Paradise | Sept. 7, 1954 |

FOREIGN PATENTS

| | | |
|---|---|---|
| 155,337 | Australia | Feb. 19, 1954 |